(12) United States Patent
Shukla et al.

(10) Patent No.: US 8,228,937 B2
(45) Date of Patent: Jul. 24, 2012

(54) METHOD FOR EXTENDING A HETEROGENEOUS MAC PROTOCOL TO MULTI-CHANNEL SYSTEMS

(75) Inventors: Amit Shukla, Plantation, FL (US); Shashidhar R. Gandham, Sunrise, FL (US); Shih-Chun Chang, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 530 days.

(21) Appl. No.: 12/460,497

(22) Filed: Jul. 20, 2009

(65) Prior Publication Data

US 2010/0014503 A1      Jan. 21, 2010

Related U.S. Application Data

(60) Provisional application No. 61/135,511, filed on Jul. 21, 2008.

(51) Int. Cl.
*H04B 7/212* (2006.01)
(52) U.S. Cl. ........................................ 370/442; 370/458
(58) Field of Classification Search .............. 370/442–3, 370/445, 447, 458, 461, 462, 468, 498
See application file for complete search history.

(56) References Cited

U.S. PATENT DOCUMENTS

| | | | |
|---|---|---|---|
| 5,974,034 A * | 10/1999 | Chin et al. | 370/328 |
| 6,212,221 B1 * | 4/2001 | Wakayama et al. | 375/133 |
| 6,285,662 B1 * | 9/2001 | Watanabe et al. | 370/280 |
| 6,594,252 B1 | 7/2003 | Barany et al. | |
| 7,110,380 B2 | 9/2006 | Shvodian | |
| 7,376,425 B2 * | 5/2008 | Laroia et al. | 455/437 |
| 2007/0105576 A1 | 5/2007 | Gupta et al. | |
| 2007/0243822 A1 * | 10/2007 | Monte et al. | 455/12.1 |
| 2010/0046449 A1 * | 2/2010 | Denteneer et al. | 370/329 |

* cited by examiner

*Primary Examiner* — Anh-Vu Ly
*Assistant Examiner* — Peter Cheng
(74) *Attorney, Agent, or Firm* — Dennis L. Cook, Esq.

(57) ABSTRACT

An extension to a heterogeneous MAC protocol that makes provisions for multi-frequency system architecture is described. A new frame structure for a multi-frequency xMAX system is introduced. Multi-frequency xMAX system is an extension of a single-channel xMAX system, where the available bandwidth is split into multiple channels to provide additional capacity and range. The new frame structure is followed by all channels and is designed to fulfill the requirements of multiple frequency operation. The new frame structure incorporates features that allow the handset to leverage the advantages of multiple frequency channels, especially in the event of interference. Also, a new mechanism to reduce the power consumption in the handset is discussed that significantly reduces the number of unnecessary receive operations at the handset.

2 Claims, 4 Drawing Sheets

Figure 1

| Channel # | Center Frequency | Channel # | Center Frequency |
|---|---|---|---|
| 1 | 902.72 | 10 | 915.68 |
| 2 | 904.16 | 11 | 917.12 |
| 3 | 905.6 | 12 | 918.56 |
| 4 | 907.04 | 13 | 920 |
| 5 | 908.48 | 14 | 921.44 |
| 6 | 909.92 | 15 | 922.88 |
| 7 | 911.36 | 16 | 924.32 |
| 8 | 912.8 | 17 | 925.76 |
| 9 | 914.24 | 18 | 927.2 | ced
METHOD FOR EXTENDING A HETEROGENEOUS MAC PROTOCOL TO MULTI-CHANNEL SYSTEMS

CROSS-REFERENCE TO RELATED APPLICATION

The present application claims the benefit of previously filed co-pending Provisional Patent Application, Ser. No. 61/135,511.

FIELD OF THE INVENTION

This invention addresses the need to transport high bit-rate data and voice to multiple users over wired and wireless means. Specifically, this disclosure describes an extension to a heterogeneous MAC protocol that makes provisions for multi-frequency system architecture. The new frame structure incorporates features that allow the handset to leverage the advantages of multiple frequency channels, especially in the event of interference. Also, a new mechanism to reduce the power consumption in the handset is discussed that significantly reduces the number of unnecessary receive operations at the handset.

BACKGROUND OF THE INVENTION

The invention disclosed in this application uses any integer cycle or impulse type modulation and more particularly is designed to work with a method of modulation named Tri-State Integer Cycle Modulation (TICM) which has been previously disclosed in U.S. Pat. No. 7,003,047 issued Feb. 21, 2006 and is now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although the method of using an extension to a heterogeneous MAC protocol that makes provisions for multi-frequency system architecture is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos. 12/069,057; 12/070,0817; 12/380,698; 12/384,546; 61/125,696; 61/132,160; and, 61/132,131 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of an extension to a heterogeneous MAC protocol that makes provisions for multi-frequency system architecture as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMax, but can be implemented on WiMax, WiBro, WiFi, 3GPP and HSDPA, or any other type of wired or wireless VoIP systems A new frame structure for a multi-frequency xMAX system is introduced. A multi-frequency xMAX system is an extension of a single-channel xMAX system, where the available bandwidth is split into multiple channels to provide additional capacity and range. The new frame structure is followed by all channels and is designed to fulfill the requirements of multiple frequency operation.

DESCRIPTION OF THE DRAWINGS

For a fuller understanding of the nature and objects of the invention, reference should be made to the accompanying drawings, in which:

FIG. 1 is a table showing the list of channels in xMAX;

DETAILED DESCRIPTION OF THE INVENTION

In the preferred embodiment of the invention the multi-frequency xMAX system operates in the 900 MHz Industrial Scientific and Medical (ISM) band that encapsulates frequencies from 902 MHz to 928 MHz. xMAX splits the 26 MHz band into 18 1.44 MHz wide channels, each providing a maximum data rate of 1 Mbps. The center frequency of each channel (in MHz) is calculated using the following formula:

$$Fc_n(\text{MHz}) = 902.72 + 1.44(n-1)$$

A list of channels with their center frequencies is shown in FIG. 1.

The coverage area of each cell is split into three 120-degree sectors, with a maximum of six channels servicing a sector. Each channel is split into multiple fixed duration timeslots that provide Uplink and Downlink data/Control paths to end user devices such as handsets or modems.

A typical xMAX system consists of one base station servicing multiple end user devices. An end user device can be classified as:

Mobile Handset: such a device provides voice-only services. The handset is mobile and free to move within the cell without affecting the voice quality. To reduce cost, the handset employs lower end processors with limited memory. Thus, it is not capable of buffering multiple incoming packets at the physical layer. This limitation leads to a processing delay for each packet received by the handset. In other words, a handset cannot receive two packets back to back. Typically, two consecutive packets will be separated by a period of 500 us.

Data Modem: a data modem predominantly is used for data access. It is not expected to be mobile and power consumption is not a critical concern, unlike a handset. It therefore employs higher end processors with sufficient memory to buffer multiple packets at a time. A modem does not have any limitations as far as reception of back-to-back packets is concerned.

Figure 2:
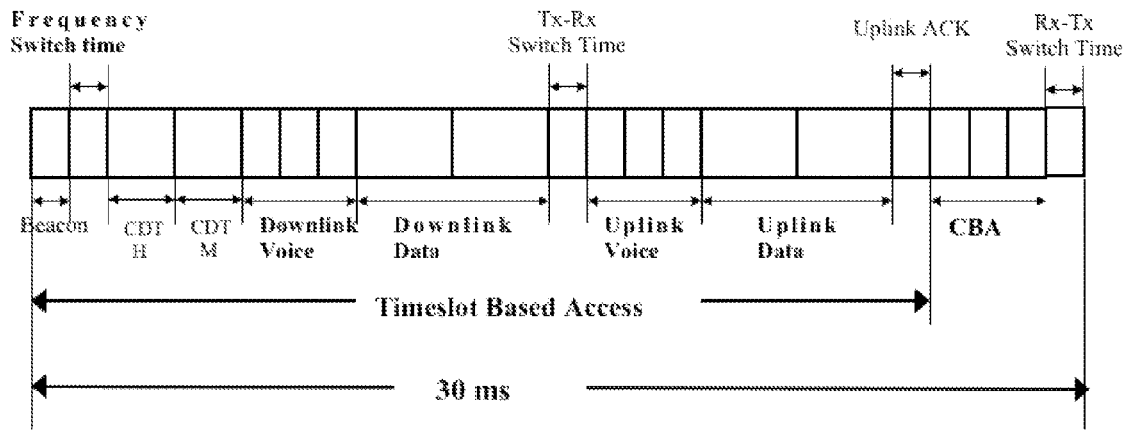
FIG. 2 is a diagram showing the basic Super-Frame structure.
Figure 2:
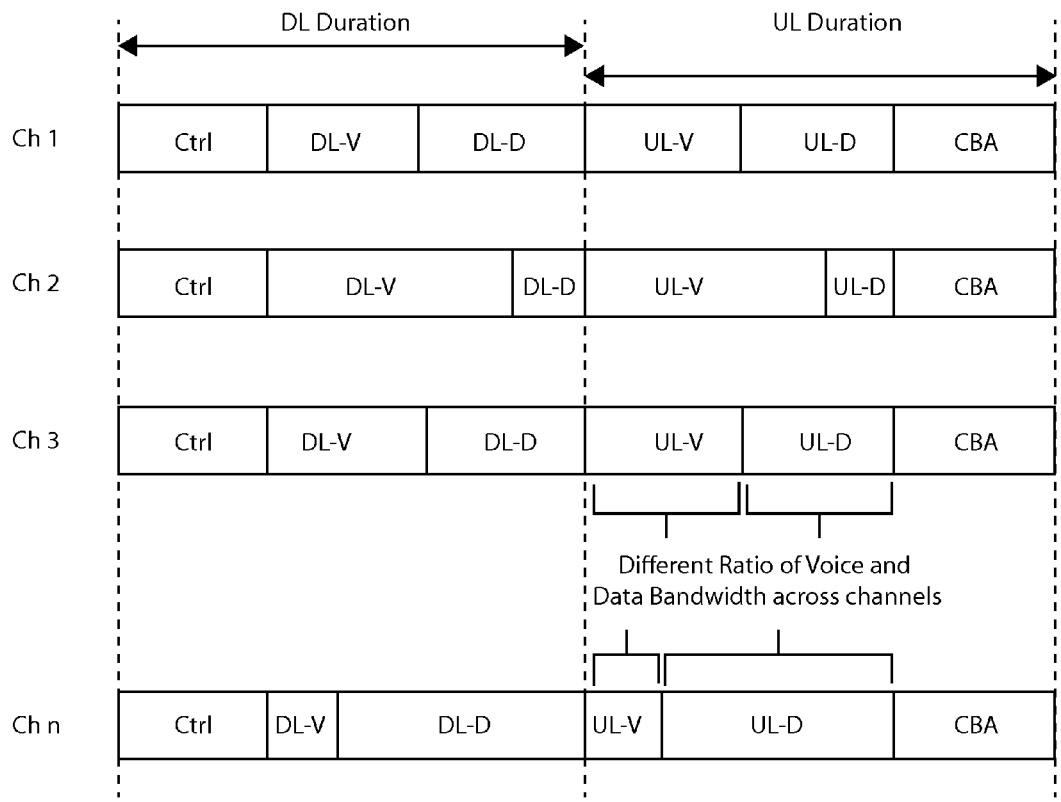

In the heterogeneous MAC protocol used in xMAX the time domain is sliced into equal intervals of time referred to as a super-frame (refer to FIG. 2). Each super-frame consists of a Timeslot Based Access (TBA) period and a Contention Based Access (CBA) period. During CBA, nodes randomly select a timeslot to transmit control packets. In case there is a collision, the node performs a binary exponential back-off. In this respect, the structure is similar to the frame structure of the single frequency xMAX system. However, new elements are introduced in the preferred embodiment described herein that are specific to multi-frequency operation.

The base station can dynamically decide the duration of a super-frame, which depends on the duration of speech that is carried in each packet. For example, if 30 ms of speech were sent in each packet then the duration of the super-frame would be 30 ms. Note that each timeslot is long enough to transmit exactly one packet. By having a super-frame of 30 ms duration we can ensure that a voice packet is forwarded as soon as it is generated. As a result, no significant delay is introduced in forwarding the packet over the xMAX network. For all practical purposes, the super-frame duration is fixed at 30 ms.

The Timeslot Based Access (TBA) can be logically subdivided into Uplink Duration and Downlink Duration. The duration of both uplink and downlink is fixed, however, the ratio of voice and data slots within each duration may vary dynamically depending upon the traffic distribution as shown in FIG. 2. TBA is comprised of the following:

Beacon: The beacon is sent at the beginning of each super-frame and it allows the handsets to synchronize with the base station. It contains information such as Base Station ID, Residual Capacity, Interference etc. This information allows a new handset to identify and join a suitable base station. It also assists during handoffs by allowing a handset to collect information about other frequency channels supported by a base station. Since the beacon contains information that is not time-critical, a handset is not required to receive every beacon. This allows the handset to switch to different channels, receive beacons to estimate channel conditions, and switch back in time to receive data.

Frequency Switch Time: This is the time needed by the handset to switch from one frequency channel to another. Such a switch is needed when the handset performs proactive scanning, during which it switches to a different channel at the beginning of a super-frame to receive the beacon. After receiving the beacon, the handset must switch back to the original channel to receive the CDT. The time needed for this frequency switch is currently 0.5 ms. Because of this, and the above provision in the frame structure, the handset is able to scan other channels while maintaining the current voice session. This allows the handset to switch to a different frequency channel in the event of interference.

Control Data Timeslot-Handset (CDT-H): In CDT-H, the base station transmits control information regarding the current super-frame that is required by the handset. Control information can include: (a) duration of the current super-frame, (b) duration of CDT, (c) duration of Uplink/Downlink, (d) Registration acknowledgement, (e) changes in timeslot assignment from the previous super-frame, (f) Voice and Data timeslot assignment etc. Notification of an incoming call is also announced in the CDT. This CDT will not be received by the data modem.

Control Data Timeslot-Modem (CDT-M); In CDT-M, the base station transmits control information regarding the current super frame that is required by the modem to initiate and maintain a data session. Only data modems receive this CDT. The handset uses this time to process CDT-H. As explained above, the handset cannot buffer two consecutive packets. CDT-M also serves as a time gap between the CDT-H and the first voice timeslot to allow for CDT-H processing at the handset. A super-frame Info Control Element is present in CDT-H that is required by both handsets and data modems to ascertain timing information. There are two options for providing this information to a data modem: 1) A copy of super-frame Info Control element will be provided in CDT-M; and 2) The data modem will receive both CDT-H and CDT-M packets.

Downlink Voice: The base station forwards voice packets to the mobile nodes in downlink voice timeslots. The assignment for this timeslot is announced in the CDT and the assignment is valid for the entire duration of the voice session. The size of each timeslot is long enough to carry RTP packets with compressed headers.

Downlink Data: Downlink data timeslots serve two purposes; they carry SIP signaling messages and serve data modems. These timeslots are assigned to a handset for a fixed time duration. Once the lease expires, the timeslots are released. If the base station has more data waiting to be sent, the timeslot is reassigned. Data timeslots are much bigger than voice timeslots, thus the size of SIP or Data packets is not fixed, and may need to be fragmented. To reduce the number of fragments sent over the air, the size of the data timeslot is fixed to the maximum possible value.

Tx-Rx Switch time: This time period allows the base station to switch from transmit mode to receive mode. This time is set to 500 us.

Uplink Voice: The handset forwards all voice traffic to the base station during these timeslots. These timeslots are assigned, along with the Downlink voice timeslots, in the CDT.

Uplink Data: Similar to Downlink Data, this timeslot is used to carry Uplink SIP and Data traffic. Handsets and data modems must acquire these timeslots by sending a request to the base station in the CBA. The base station then makes the assignment in the CDT. The timeslot is assigned for a fixed time period and the handset must request it again after the lease expires. The base station will send ACK for the data received during these timeslots in the CDT.

Uplink ACK: Uplink ACK is used by the handset to send acknowledgement for the data received in the Downlink data timeslot. The assignment for this timeslot is made along with the Downlink data timeslot i.e. they are assigned in pairs.

Rx-Tx Switch time: This time period allows the base station to switch from receive mode to transmit mode at the end of Uplink period. This time is set to 500 us.

The Contention Based Access (CBA) period is used by handsets and data modems to forward control and signaling packets to the base station. xMAX control messages are exchanged between a base station and mobile nodes when: (1) nodes join/leave the network, and (2) nodes initiate a voice session. The CBA time period is sliced into fixed size timeslots. A node randomly selects a timeslot to transmit its data. If two nodes select the same timeslot, a collision will occur at the base station.

When a handset tries to send a packet in CBA, it randomly selects a timeslot in $\{0, CW_{min}\}$, where $CW_{min}$ denotes size of the Contention Window. If the packet cannot be successfully delivered, the handset increases the value of CW by a factor of 2 as follows:

$$CW = CW_{min} \times 2$$

Therefore, the handset now will select a CBA timeslot in $\{0, CW\}$ where CW is twice as large as $CW_{min}$. With increasing CW value, the contention level of CBA will decrease every time a handset encounters a collision.

The initial value of $CW_{min}$ can vary based on the current contention level measured by a base station in accordance with the number of collisions and the number of busy CBA timeslots, and that initial value will be announced in CDT. The maximum value of CW is $CW_{max}$. Higher priority packets can be assigned lower initial value.

Figure 3:
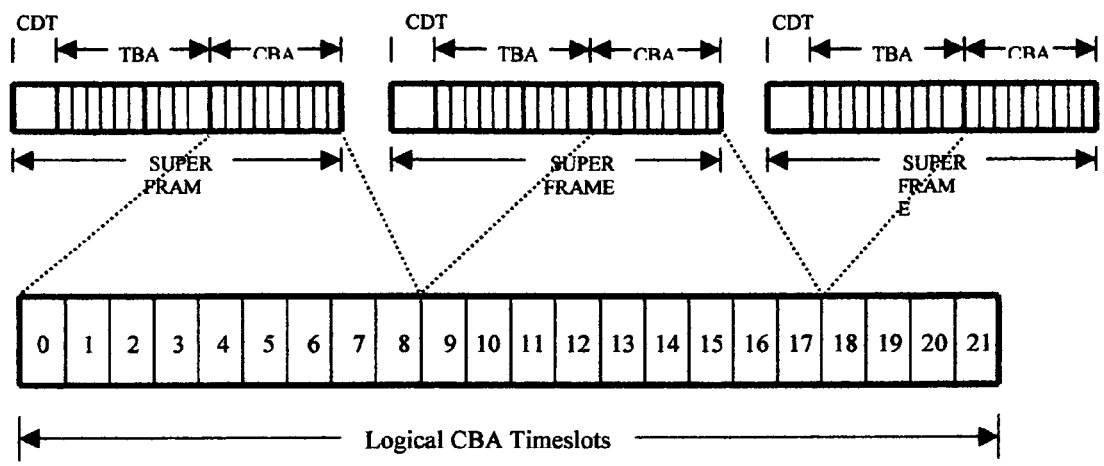
FIG. 3 is a diagram showing logically continuous CBA timeslots.

Since there is only a finite number of CBA timeslots in a super-frame, it is possible that a CW chosen by a handset is larger than the available CBA timeslots in the current super-frame. CBA timeslots are logically continuous to handsets as shown in the FIG. 3. For example, if there are 9 CBA timeslots in a super frame, and a handset selects the $12^{th}$ timeslot, the handset will send its packet in the $4^{th}$ CBA timeslot of the $2^{nd}$ super-frame. Random back-off is employed once a collision is detected.

In order to decrease the probability of a collision in a CBA timeslot, the CWmin value must be adjusted as the contention level varies. Any handset that is not in random back-off process will set its CWmin value according to the value announced in CDT. Note that handsets already in random back-off disregard the CWmin announcement.

We define CLS (contention level) as the number of handsets that are trying to contend for CBA timeslots in a super-frame as follows:

$$CLS = \text{\# success} + (\text{\# collision}) \times 2$$

However, if the contention level is very high, CLS above may not be able to reflect the real contention level. Therefore, CLS can give more weight to a collision. One can then calculate the percentage of collisions over the entire CBA slots, and the CLS calculation is now:

$$CLS := (\text{\#success})/2 + (\text{\# collision}) \times 2 \times ((\text{\# collision})/\text{NUM\_CBA\_SLOTS} + 1)$$

Since CLS is measured in entire CBA slots of a super-frame, CWmin may be more or less than the number of CBA slots. Thus we scale contention level to CWmin duration as follows:

$$CLW = CLS \times CWmin/NUM\_CBA\_SLOTS$$

CLW indicates the number of contentions in $CW_{min}$, therefore the new CWmin value can be adjusted according to CLW to lower the collision probability. Note that the measurement only estimates CLS in the current super-frame. It may be possible that those that successfully transmitted their packets in the current super-frame won't contend for CBA slots in the next super frame. In the calculation, CLS won't count idle CBA timeslots. Therefore, when the contention level is low, CWmin may set to a default value.

In handset design, power consumption, and hence battery life is a major factor. The receiver is a major source of power consumption on the handset. One way to reduce power consumption is by eliminating a number of unnecessary receive operations at the handset.

In the xMAX system, it is not necessary for the handset to receive every beacon, as most of the information in the beacon is redundant and does not vary significantly over time. Similarly, CDT does not need to be received in every super-frame. A handset can wake up periodically and receive CDT to see if any incoming messages are pending. A substantial amount of power can be saved by cutting down on the number of receive operations.

To achieve this, the concept of Hyper-frame is introduced, that enables scheduling of beacon and CDT reception at pre-defined intervals. The Hyper-frame consists of eighteen super-frames that are grouped together to provide well-defined boundaries. The base station will determine the boundary of the Hyper-frame and convey this information to the handsets and data modems in the beacon of each super-frame.

The beacon contains a 32-bit field called Frame Number where the lower 8 bits refer to super-frame number and upper 24 bits refer to Hyper-frame number. The super-frame number field wraps around after the Hype-frame duration. At every wrap-around, the Hyper-frame count is incremented by 1.

Figure 4:
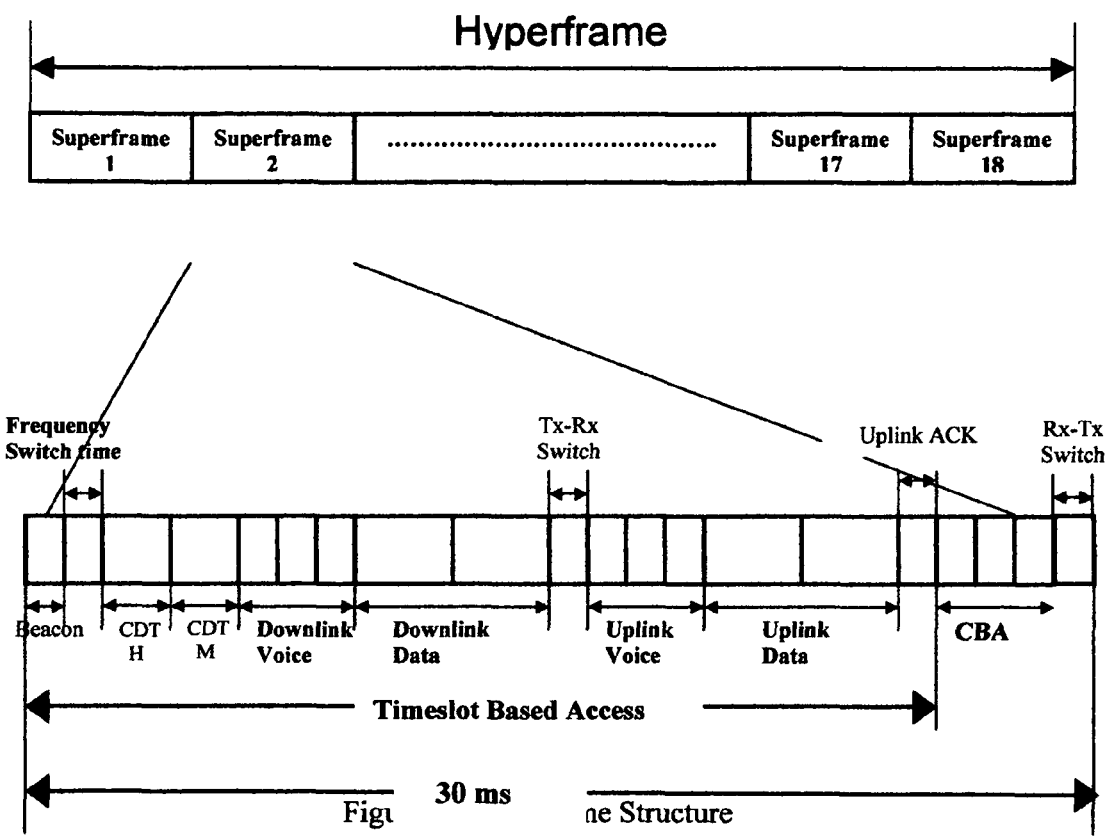
FIG. 4 is a diagram showing a hyper-frame structure.

When a handset joins a network, it will extract the super-frame number from the beacon and use that number to schedule the reception of beacons and CDTs in the future. For example, if a handset joins the network in the sixth super-frame of a Hyper-frame, it will always wake up in the sixth super-frame of all subsequent Hyper-frames to receive beacons and CDTs. Similarly, this boundary can be used to schedule proactive scanning, i.e. listening to the beacons from other channels. FIG. 4 depicts the Hyper-frame structure with respect to a super-frame.

Since certain changes may be made in the above described extension to a heterogeneous MAC protocol that makes provisions for multi-frequency system architecture without departing from the scope of the invention herein involved, it is intended that all matter contained in the description thereof, or shown in the accompanying figures, shall be interpreted as illustrative and not in a limiting sense.

What is claimed is:

1. A method using a medium access control protocol that combines contention-free and contention-based medium access control protocols into a heterogeneous medium access control protocol for forwarding Internet Protocol packets containing voice traffic, signaling traffic, and application data traffic between a base station having two or more multi-frequency channels and mobile nodes and fixed modems in a voice over internet protocol system on a wireless network comprising:

A base station having two or more multi-frequency channels in electrical communication with the Internet;

one or more mobile nodes and fixed modems in wireless electrical communication with said base station;

said base station and said one or more mobile nodes and fixed modems each being configured with said medium access control protocol;

wherein first, said medium access control protocol having super-frames of equal intervals of time;

then each of said super-frames being divided into an initial time for contention-free timeslot based access voice traffic and a remainder time for contention-based access signaling traffic and application data traffic;

then said base station dynamically determining a time duration of said initial time for contention-free timeslot based access based on a packetization interval determined by the duration of the voice traffic in said Internet Protocol packets;

then said initial time for contention-free timeslot based access being divided into a beacon timeslot containing information about said base station capacity and interference, frequency switch timeslot that is the time needed by a mobile node to switch from one frequency to another, mobile node control data timeslot that contains information regarding a current super-frame required by said mobile node, modem control data timeslot that contains information regarding a current super-frame required by said modem, downlink voice timeslot where said base station forwards voice packets to a mobile node, downlink data timeslot where a base station forwards SIP signaling messages to a modem, transmit/receive timeslot that is the time required for a base station to switch from transmit mode to receive mode, uplink voice timeslot where a mobile node forwards voice packets to a base station, uplink data timeslot where a modem forwards SIP signaling messages to a base station, uplink acknowledgement timeslot where a mobile node forwards acknowledgement of data received in the downlink data timeslot, and receive/transmit timeslot that is the time required for a base station to switch from receive mode to transmit mode;

then the duration of the combination of said downlink voice timeslot and said downlink data timeslot being fixed but a ratio of the duration of said downlink voice timeslot and said downlink data timeslot dynamically varying between said two or more multi-frequency channels and wherein the dynamic variations are based upon information contained in said mobile node control data timeslot;

then said contention-based access time having fixed size timeslots for forwarding control messages transmitted between said base station and said one or more mobile nodes or fixed modems when said one or more mobile nodes or fixed modems join or leave the wireless network or initiate a voice session and for forwarding control and signaling packets from said one or more mobile nodes or fixed modems to said base station;

then said one or more mobile nodes randomly selecting a timeslot to forward a packet wherein the number of possible timeslots said one or more mobile nodes can select from are dynamically controlled and can exceed the number of assigned timeslots in one super-frame by using timeslots from an adjacent super-frame: and, said method comprising:

forwarding said Internet Protocol packets between said base station and said one or more mobile nodes and fixed modems via said super-frames in accordance with said medium access control protocol.

2. The method using a medium access control protocol of claim 1 further comprising wherein then a selected number of said super-frames being uniquely identified and combined into a hyper-frame that repeats itself such that when a mobile node first transmits and joins to a base station said mobile node remembers the uniquely identified super-frame it joined in and schedules the reception of beacons and control data timeslots only during said uniquely identified super-frame.

* * * * *